United States Patent [19]

Ayrai et al.

[11] Patent Number: 4,818,877
[45] Date of Patent: Apr. 4, 1989

[54] MEMORY DISPLAY SYSTEM

[75] Inventors: Jean L. Ayrai, Paris; Christian Maillot, St. Mande; Francois Micheron, Gif Sur Yvette, all of France

[73] Assignee: Thomson-CSF, Paris, France

[21] Appl. No.: 18,532

[22] Filed: Feb. 25, 1987

[30] Foreign Application Priority Data

Feb. 28, 1986 [FR] France ................. 86 02876

[51] Int. Cl.⁴ ............................................. G01T 1/105
[52] U.S. Cl. ........................... 250/484.1; 250/361 R; 250/368
[58] Field of Search ............... 250/484.1, 327.2, 368, 250/361 R, 327.2 R, 327.2 A–327.2 E, 484.1 R

[56] References Cited

U.S. PATENT DOCUMENTS

| | | | |
|---|---|---|---|
| 2,933,602 | 4/1960 | Gillson, Jr. | 250/484.1 |
| 2,990,473 | 6/1961 | Kallmann | 250/484.1 |
| 3,500,101 | 3/1970 | Burns | 250/484.1 |
| 3,601,610 | 8/1971 | Nakamura et al. | 250/484.1 |
| 3,710,127 | 1/1973 | Kohashi et al. | 250/484.1 |
| 3,932,756 | 1/1976 | Cowell et al. | 250/361 R |
| 3,940,201 | 2/1976 | Micheron et al. | 350/3.74 |
| 3,978,458 | 8/1976 | Vergnolle et al. | 365/64 |
| 4,055,838 | 10/1977 | Huignard et al. | 365/117 |
| 4,063,795 | 12/1977 | Huignard et al. | 365/125 |
| 4,065,671 | 12/1977 | Mayeux et al. | 378/29 |
| 4,124,268 | 11/1978 | Micheron et al. | 350/3.63 |
| 4,163,162 | 7/1979 | Micheron | 307/400 |
| 4,176,345 | 11/1979 | Micheron et al. | 340/815.24 |
| 4,205,242 | 5/1980 | Micheron et al. | 307/400 |
| 4,210,805 | 7/1980 | Kobayashi et al. | 250/370 R |
| 4,227,082 | 10/1980 | Mayeux et al. | 250/336.1 |
| 4,368,386 | 1/1983 | Huignard et al. | 250/213 R |
| 4,380,702 | 4/1983 | Takahashi et al. | 250/484.1 |
| 4,492,121 | 1/1985 | Lehto | 250/368 |
| 4,708,989 | 11/1987 | Broussoux et al. | 529/199 |
| 4,734,228 | 3/1988 | Micheron et al. | 264/22 |

FOREIGN PATENT DOCUMENTS

| | | | |
|---|---|---|---|
| 0007105 | of 0000 | European Pat. Off. | |
| 0156258 | of 0000 | European Pat. Off. | |
| 0156204 | 10/1985 | European Pat. Off. | 250/361 R |
| 0207083 | 10/1985 | Japan | 250/368 |
| 1466869 | of 0000 | United Kingdom | |
| 1185832 | of 0000 | United Kingdom | |
| 1208308 | 10/1970 | United Kingdom | 250/484.1 |

Primary Examiner—Janice A. Howell
Assistant Examiner—William F. Rauchholz
Attorney, Agent, or Firm—Oblon, Fisher, Spivak, McClelland & Maier

[57] ABSTRACT

A memory display system is provided including:

a recording support medium having a layer of a luminescent material capable of storing energy coming from a light beam, electrodes enclosing the luminescent material and applying thereto an electric field for releasing the previously stored energy in the form of a beam;

an optical transmission device placed in the path of said beam;

a sensor receiving this beam and converting the intensity of the light beam into an electric signal;

a processing circuit receiving said electric signal, processing it and controlling display thereof on a display device.

18 Claims, 6 Drawing Sheets

FIG_2

FIG_11

FIG_3

FIG_4

FIG_5

FIG_6

FIG_7

FIG_8

FIG_9

ADRESSE

FIG_10

ADRESSE

FIG_12

FIG. 13

MEMORY DISPLAY SYSTEM

BACKGROUND OF THE INVENTION

The present invention relates to a memory display system. With this system a latent image is formed first of all, which is developed by electric stimulation, in the form of a light ray at a wavelength generally greater than that used for recording. More precisely, this device relates to X ray image formation, with sequential type electric access.

The image forming process which we propose is intended to replace the photographic film, still widely used today in numerous fields, and in particular for X ray image formation. In the case where the system proves fairly rapid so as to be able to make several images per second, it may also replace the radiological image intensifier tube, in the same field as X ray image formation.

It should be recalled that the photographic film, although it has numerous advantages (sensitivity, resolution) which justify its use as image detector nevertheless has several drawbacks related on the one hand to the physical properties, namely reduced dynamics, and on the other to the nature of the detector, namely handling of the plate required for its development.

In addition, once the image is obtained on the film medium, digitization of the image with a view to subsequent processing involves an additional step requiring the use of a microdensitor meter.

Furthermore, the film is both image detector and final support medium for the image. Now, an image forming system, the performances required for the detector (dynamic/sensitivity) and those required for the support medium (strong contrast and low noise) are, to a certain extent, antagonistic. Thus, the film appears as a compromise, which necessarily sacrifices the performances of both functions.

Other image forming methods have seen the light of day, in an attempt to overcome these difficulties. There may be mentioned, for X ray image formation, on the one hand, the electrostatic or zero radiographic image formation techniques and on the other a digitized image formation technique in which a luminescent material photostimulable by laser is used as storage material for the temporary storage of the X ray image, which is described in the document "Radiology" 148, 833, Sept. 1983.

Xeroradiography gives images whose contours are strongly contrasted. This is due to the non linearity of development. On the other hand, this technique is about 20 times less sensitive to high energies than the best image forming techniques using a film-intensifying screen combination; the exposure times are consequently higher. At the present time, this technique is restricted to observation of the breast and hands and feet.

The method described in the above mentioned document has all the advantages of film image formation without having the drawbacks thereof: the sensitive memory plate and the final support medium for the image are separated. Applied to X ray image formation, the system has the resolution of the photographic film, with dynamics and sensitivity greater than those of the film. The system further allows the dose of radiation applied to the patient to be reduced with respect to systems using film. In addition, the images may be processed by computer.

As for the film, the two following drawbacks must attract attention. On the one hand, it is necessary to handle the cassette so as to develop the stored image. Acquisition of the image cannot be made in situ. On the other hand, the procedure for reading the sensitive plate by laser is time consuming: in fact, the time for acquiring an image is of the order of a minute. This does not allow the rapid taking of pictures which are interesting for following up transitory phenomena.

This is why the invention relates to a system allowing these drawbacks to be overcome and more particularly a memory image forming system which can be read in situ, without any handling.

SUMMARY OF THE INVENTION

The invention relates then to a memory display system including an illuminating source of radiation, with a beam of a given wave length, a body to be explored, a support medium sensitive to the wavelength receiving the beam retransmitted by the body, wherein the support medium includes on the one hand a layer of luminescent material capable of storing energy from said beam in its metastable states and releasing it under the effect of electric excitation, in the form of a light beam and, on the other hand, means for applying said electric excitation to the luminescent material;

the display device, further including an optical transmission device receiving the light flux and retransmitting it;

a sensor receiving the light flux retransmitted by the optical transmission device and converting the intensity of the light flux into an electric signal;

a processing circuit receiving said electric signal, processing it and controlling its display on a display device.

BRIEF DESCRIPTION OF THE DRAWINGS

The different objects and characteristics of the invention will be clearer from the following description with reference to the accompanying Figures which show.

DETAILED DESCRIPTION OF THE INVENTION

Figure 1:
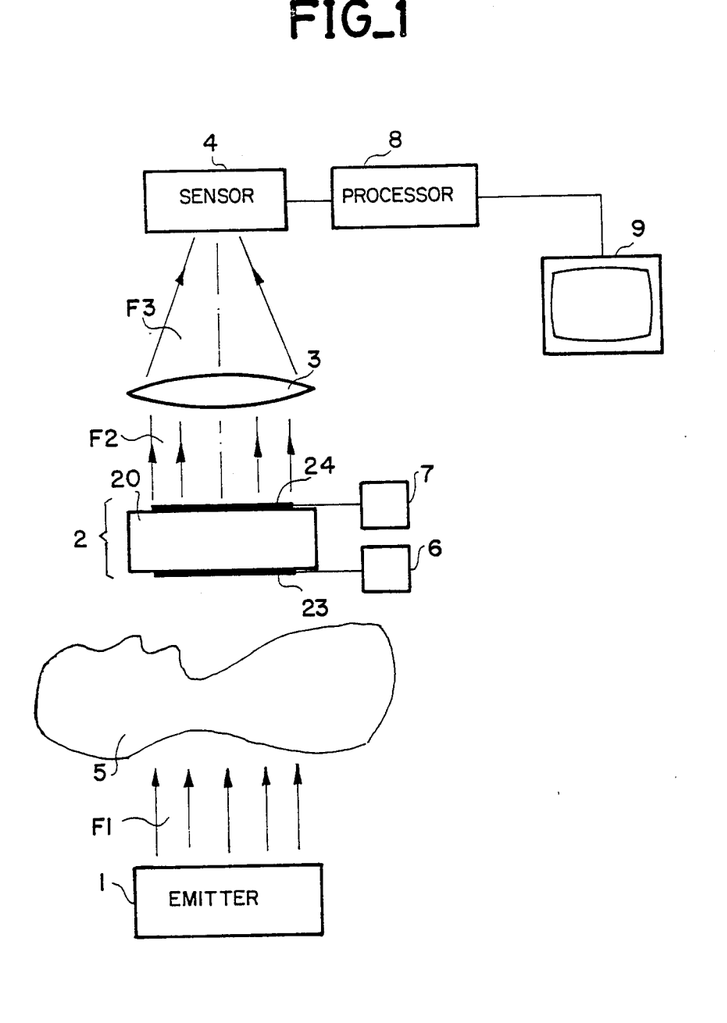
FIG. 1, a general diagram of the system of the invention.

Referring to FIG. 1, a general diagram of the system of the invention will be first of all described.

In this Figure we find a radiation transmitter 1, for example an X ray transmitter, transmitting a beam F1 towards a human body 5 a part of which it is desired to radiograph. On the other side of the human body 5 with respect to the transmitter 1 there is provided a screen 2 sensitive to the radiation emitted by transmitter 1. This screen 2 contains a luminescent material 20 whose characteristics will be described further on, and which has the property of absorbing the energy conveyed by beam F1.

In accordance with the invention, screen 2 has, on each side of the luminescent material 20, two electrodes 23 and 24. One at least of these electrodes may be blocking as will be described in connection with FIG. 12. These electrodes are connected to voltage sources 6 and 7 for bringing the electrodes 23 and 24 to different voltage levels so that the material 20 is subjected to an electric field. The purpose of this electric field is to excite the luminescent material and to release the energy, accumulated during reception of the X ray beam F1, in the form of a light flux F2.

Beam F2 is transmitted to an optical transmission device such as a lens 3 which retransmits a beam F3 to a sensor 4 which converts the image conveyed by beam F2 into electric signals.

Electric signals are transmitted to a processing circuit 8 which controls display of the transmitted image on a display device 9.

Figure 2:
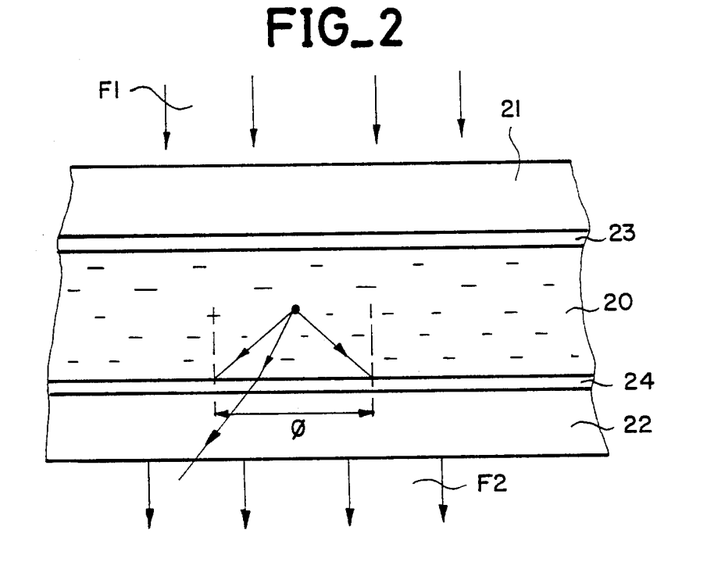
FIG. 2, a detail view of a light sensitive screen in accordance with the invention.

Referring to FIG. 2, one embodiment of the screen 2 will be described.

This screen has two plates 21 and 22 enclosing a luminescent material. On the faces of these plates in contact with the luminescent material are placed electrodes 23 and 24 facing each other. One at least of these electrodes may be blocking, this blocking character being obtained by inserting a dielectric between the luminophore and the electrode.

Plate 21 and electrode 23 disposed on the side receiving beam F1 are transparent to the wavelength of beam F1. In the case of X ray operation, it lets these rays pass through so that the luminescent material accumulates energy.

Plate 22 and electrode 24 are transparent to the light radiation emitted by the luminescent material under the effect of electric excitation.

Screen 2 is sensitive to energy between a few electron-volts and several tens of kilo-electron-volts (visible radiation, ultraviolet, X), and which may even reach several mega-electron-volts for radiotherapeutic applications.

The luminescent material 20 is coated with an organic (polymer) or inorganic (glass, ceramic) binder.

Luminescent materials which are stimulable by means of an electric field are capable, on the one hand, of storing the energy absorbed coming from the incident radiation in metastable states of very long duration and, on the hand, of releasing this energy, in the form of luminescence when an electric field is applied in the material. The energy emitted by luminescence is proportional to the absorbed energy, that is to say to the number of photons of the incident radiation. The energy of an emitted photon is less than that of an incident photon. In particular, it is possible to restore a visible image from an X ray recording.

This phenomena was revealed in particular with zinc sulphide materials doped for example with copper and is in this case known under the name of Gudden and Pohl effect. In zinc sulphide, the storage times of the latent image are very long (several hours) and the fields to be applied for releasing luminescence are of the order of $10^4$ V/cm.

The plate sensitive to the radiation transporting the image is formed, as we have already mentioned, of a luminescent material which is in the form of a powder, and which is shaped in a binder.

To minimize degradation of the signal to noise ratio during detection, it is necessary, in a first step of forming the latent image, for absorption of the radiation by the material to be very efficient.

In the case of low energy radiation, visible or ultraviolet, the widths of the prohibited band must be less than the energy of the incident photons. This desertion may be slightly modified if there exists an absorption band from a level situated within the prohibited band. Zinc sulphides doped with copper, or lead, or manganese are suitable in these cases. The dope concentrations are low, 10 to 100 ppm.

In the case of high energy photon radiation (X, $\gamma$ rays) the interaction with the material is different from the foregoing. The absorption of the radiation is all the better the higher the average atomic number of the material. Now, the absorption must take place over a very small thickness for the resolution of the image developed by the electric field to be good. In fact, the luminescence emitted under the action of an electric field is isotropic. That is to say that it takes place in all directions in space. The phenomenon will be understood with the help of FIG. 2.

If the active layer is too thick, a photoemitting point will appear in the form of a spot at the time of detection as indicated by the width $\phi$ of the spot.

Other arguments contribute to reducing the thickness of the active layer. In fact, the greater the thickness the higher the losses through diffusion on the grains or reabsorption of the emitted light.

For a given resolution there exists then an optimum thickness of material. In the case of X ray excitation, to each energy of the X rays to be detected there corresponds then a class of materials of given average atomic number for a minimum absorption fixed at 50%.

In X ray image formation, two fields of X ray energy should be distinguished:

The first concerns that of mammography, where the means energy of the X rays is about 20 keV. In this case, the sulphide materials of type ZnS doped with copper, lead or manganese and SrS doped with rare earths are suitable.

For the field of image formation using X ray energy higher than 50 keV which is that for example in bone or lung radiography, it is necessary to use material having higher mean atomic numbers. This latter class of materials is similarly usable for even higher energies (MeV). Among these materials we find: the family of oxisulphides $Ln_2O_2S$, where Ln=La, Y, Gd; materials BaFX where X=Cl, Br, I; sulphides BaS and SrS; and matrices $Y VO_4$, $Y_2O_2$ which are studied and used, either as scintillator materials, or as light emitting materials. These matrices will be optimized for the method from the grain size and doping point of view so as to provide, on the one hand, high efficiency trapping of the states excited under the effect of the radiation to be recorded and, on the other hand, efficient untrapping in the form of radiative recombination under the action of the electric field. A mixture of these different materials may be used.

The binder in which the luminescent powder is included is chosen as a function of its electric and optical properties. In particular, its dielectric permittivity will be such that the effective field localized in the grains is maximum. Furthermore, it will be transparent to the light emitted under the action of the electric field and have an optical index of refraction close to that of the powder, so as to limit optical losses.

Among the polymers usable for preparing such layers, we may mention for example polymethylmetacrylate (PMMA) prepared in solution, or the epoxy resins such as those commercialized under the name of Araldite.

The binder may also be a glass with low melting point.

Figure 3:
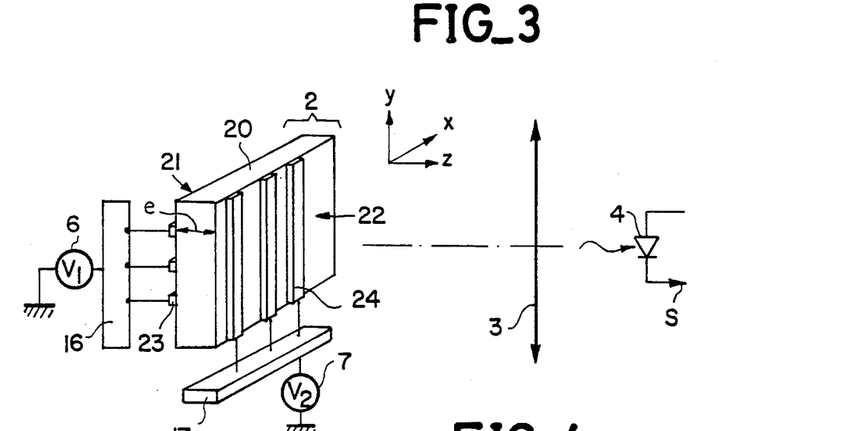
FIG. 3, one embodiment of the system of the invention with linear electrodes.

Referring to FIG. 3, a first embodiment of the system of the invention will now be described. In this Figure, only the screen 2 and its control circuits 6 and 7, lens 3 and sensor 4 have been shown. These different elements are disposed in an orthonormed reference system XYZ with a screen parallel to the plane XY and the optical axis of lens 3 parallel to the axis Z. The other elements of FIG. 1 remain the same and have not been shown.

In this embodiment, the electrodes, one of which may be blocking, are in this case deposited on each side of the luminescent material 20 on the one side in the form of lines 23 and on the other in the form of columns 24. At the intersection of a line and a column is defined a small volume of binder-luminophore mixture, of thickness e.

Since the above described effect has a threshold for an electric field Eo, such that $Eo = Vo/e$, it is sufficient to bias a line 23 to voltage $-V/2$ and a column 24 to the voltage $+V/2$, the voltage V confirming the two relationships: $V > Vo$ and $V/2 < Vo$, so as to stimulate only a single image element 23-24.

The sensor 4 includes here a pin point detector 4. It includes a detector detecting the photons emitted by screen 2 at a wavelength generally greater than that used during recording. This detector may be a photomultiplier tube whose photocathode is chosen as a function of the energy of the photons emitted or a silicon photodiode.

The conducting electrodes 24 facing detector 4 are formed of a transparent conducting material, such as a thin tin and indium oxide layer; the other electrodes 23 are formed of a thin metal layer, for example from aluminium, also serving as reflector. In the case where one of the electrodes is blocking, the dielectric may be an organic layer, for example a polymer, or a mineral layer, for example glass or a polycrystal.

Device 3 is an optical system. We mean by optical system any means capable of transporting the photons emitted by screen 2 towards detector 4, with the best possible efficiency, after electric stimulation. In the case where the detector 4 is pin point, in the sense that it only allows measurement at a given moment, device 3 will be for example: a fixed lens or optical fiber connecting an image element of screen 2 to the detector 4, in the case of an optical fiber means (not shown) will be provided for moving the screen 2 in the two directions X and Y so as to sequentially position each image element in front of the inlet face of the optical fiber. A layer of optical fibers may also be provided or any light guide in the form of a linear bar in front of the screen 2 and able to be transformed into a concentrated guide in front of the input of detector 4. In this case, a single movement of the plate is required: along Y if the bar covers a row of image elements along X.

Thus, after being exposed to the X rays passing through the body 5, the screen 2 stores a resultant image of the image formation of the body. Under the control of the operator, the stored image may be visualized at will. For that, excitation potentials are applied to electrodes 23 and 24 by means of generators 6 and 7 and sequential switches 16, 17 successively connecting the generators 6 and 7 to the different electrodes. Furthermore, detector 4 detects the light beam emitted by each intersection point at each excitation order and delivers an electric signal at an output S to the processing circuit.

Figure 4:
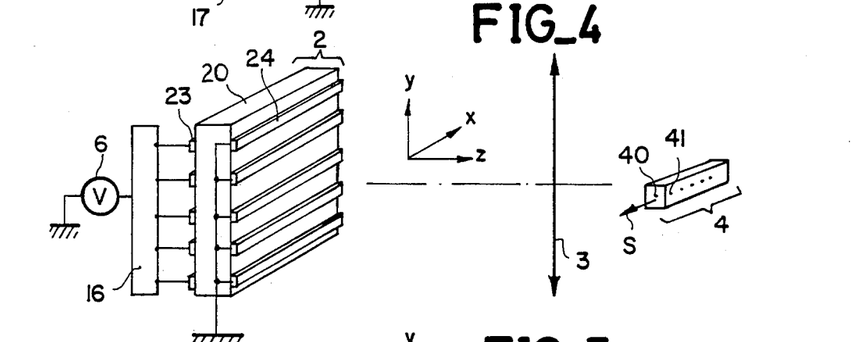
FIG. 4, another embodiment of the system of the invention with linear electrodes.

Sensor 4 may also be an assembly of detectors 40, 41 . . . aligned as is shown in FIG. 4.

In this case, a sensor 4 is a strip of charge transfer devices for the simultaneous acquisition of the photons emitted by a line (for example in direction X of the sensitive screen). The electrodes are therefore disposed in parallel lines on each side of the screen containing the luminescent material 20. Electrode 24 facing the sensor is transparent. The control voltage is applied from one line to the next, sequentially by a generator 6 and a sequential switch 16 connected to the electrodes 23, whereas the electrodes 24 are connected to a reference potential, ground for example.

The optical device 3 may be: a lens forming the image of the stimulated line of screen 2 on the detector strip 40. Any light guide of optical fiber array type may be used in the form of a linear strip placed in front of screen 2 and in the form of a strip of a size less than or equal to that of device 4. This guide, extending in direction X for example, is associated with a movement of the plate along Y so that at all times the stimulated line of the plate is in front of the light guide. Thus, for reading the screen 2, the sequential switch 16 sucessively switches the generator 6 to the different electrodes 23 and the position of screen 2 with respect to the "optics 3 - sensor 4" assembly is moved along axis Y, so as to read at all times a stimulated line of the screen.

Figure 5:
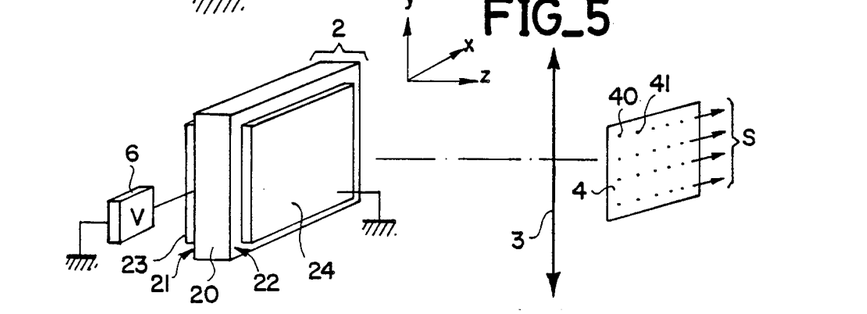
FIG. 5, one embodiment of the system of the invention with electrodes covering the whole of the surface of the light sensitive screen.

In another embodiment shown in FIG. 5, screen 2 has two electrodes 23 and 24 covering the whole surface of the screen.

In this configuration sensor 4 is a bidimensional sensor for image acquisition in one go. During restoration, the field is in this case applied uniformly over the whole of the screen by means of two electrodes deposited uniformly on the two faces. Electrode 24 facing sensor 4 is transparent. There is no mechanical movement of the plate. Sensor 4 is a DTC (meaning dispositif a transfert de charges, in French or CCD, coupled charged device, in English) type matrix or the sensitive surface of a low light level TV camera, associated with an optical system 3 which in this case is a lens for forming the image of screen 4 on the sensor 4.

With the recording of the image thus in the form of a latent image, the electric stimulation is therefore applied to the electrode at a point, a line, or the whole surface of the plate by means of a voltage pulse generator. The voltage is switched line after line in the embodiments of FIGS. 3 and 4.

Figures 6, 7:
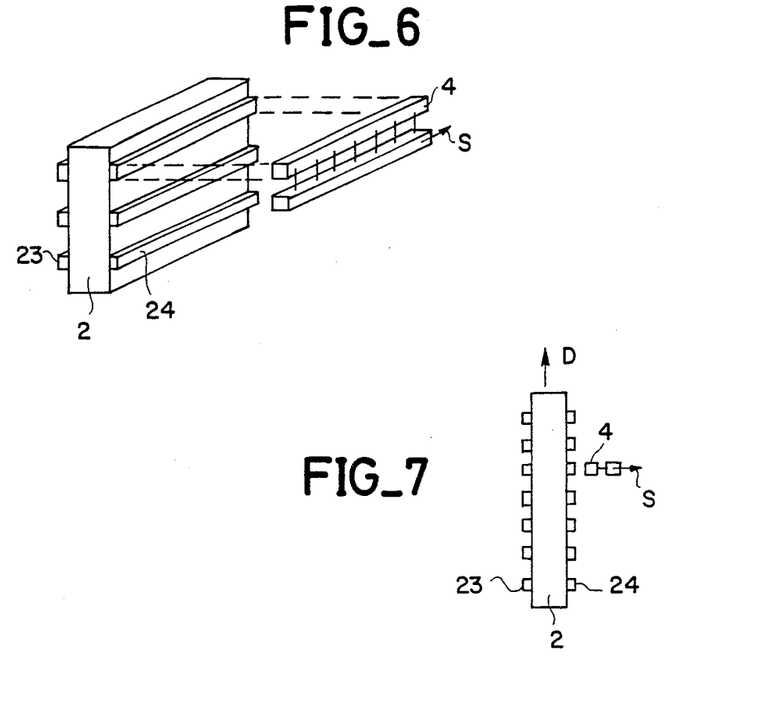
FIGS. 6 and 7, a variant of construction of the system of FIG. 4.

FIG. 6 shows a variant of construction of the system of FIG. 4 for omitting the optical device 3.

In fact, as light sensor a DTC or photodiode strip is used of a length equal to that of a line of the sensitive screen 2. The space between the transparent electrode 24 of the screen and strip 4 is minimized so as to avoid optical losses. As in the system of FIG. 3, the screen is moved step by step after each line reading with respect to the sensor 4.

FIG. 7 is a side view of FIG. 6, the system of the Figure showing the movement in the direction of arrow D of screen 2 in front of the sensor 4. It is clear that in another embodiment sensor 4 may be moved in front of screen 2 which is then held fixed.

Figure 8:
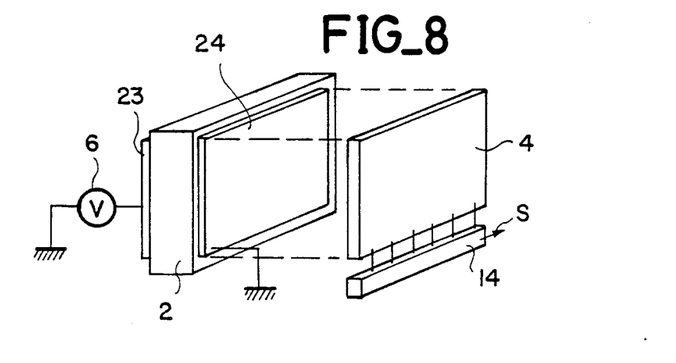
FIG. 8, a variant of construction of the system of FIG. 5.

In a variant of construction shown in FIG. 8, the optical device 3 of FIG. 5 is omitted.

In this variant, as light sensor 4 a photodiode matrix is used whose area is equal to that of the sensitive screen 2. This matrix may be the one obtained by techniques of construction on amorphous silicon. As in the preceding variant, the photodiode matrix is applied to the sensitive plate. The method then requires no mechanical movement. An output register 4 allows the photodiode matrix to be read and the reading results transferred through an output S to a processing circuit 8 not shown.

Figure 9:
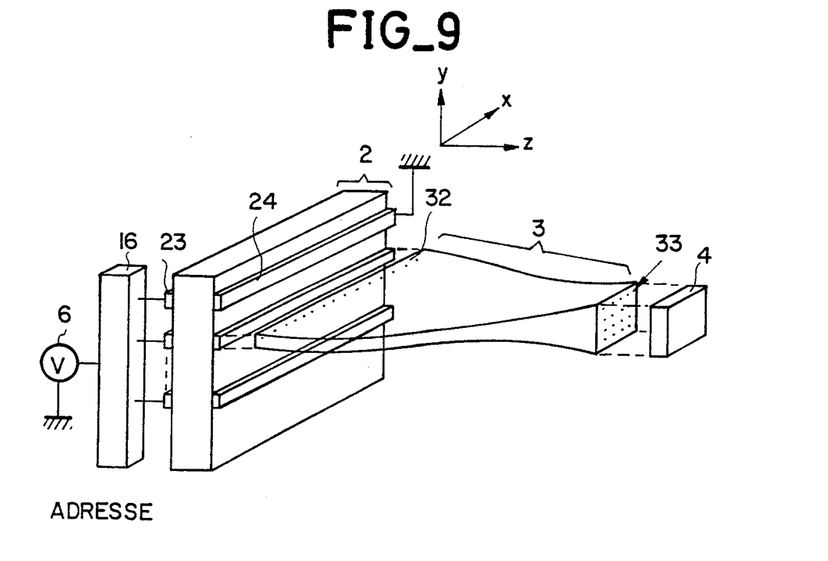
FIG. 9, another variant of construction of the system of FIG. 4.

In a variant of embodiment of the system of FIG. 4, an optical fiber network 3 connects a line of screen 2 to a sensor 4 formed of detectors disposed in a matrix. Such a construction is shown in FIG. 9.

For that, the ends 32 of the fibers are disposed in a line parallel to axis X. Screen 2 is movable in a direction parallel to axis Y so that all the screen lines defined by the lines of electrodes 23, 24 are scanned by the line of fiber ends 32.

Sensor 4 includes a matrix arrangement nxm of detectors. Each screen line then includes nxm image elements and the number of fibers 32 is also nxm. The ends of the fibers 33 are disposed in the form of a matrix of the same size as the matrix of detectors so that each fiber end 33 illuminates a detector of the sensor 4.

The electrodes 23 are fed successively with voltage by a generator 6 and an address circuit 16. Electrodes 24 are at a fixed potential, ground for example.

The sensor may in fact be a matrix of photosensitive charge transfer devices which are connected to the processing circuit not shown in FIG. 9.

Thus, a line of light information corresponding to an image line is converted into a matrix of electric signals usable by the processing circuit.

Figure 10:
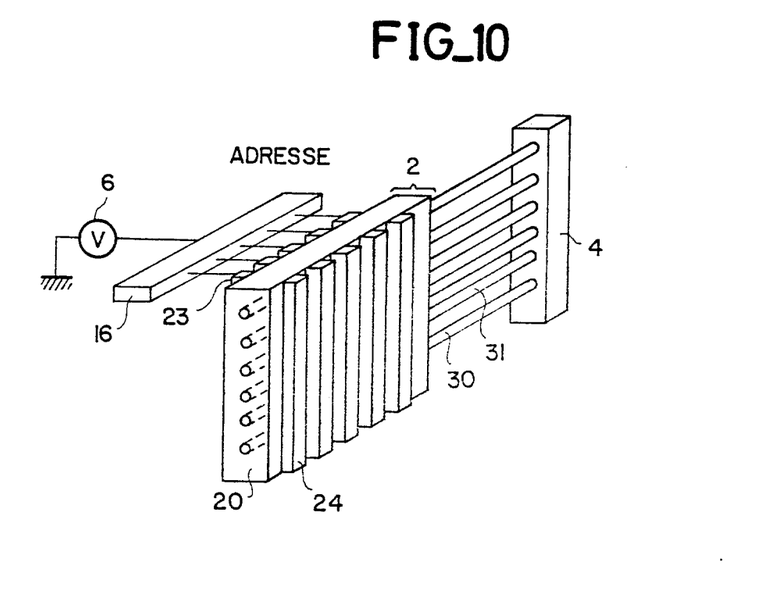
FIGS. 10 and 11, an embodiment of the system of the invention in which the optical fibers are housed in the light sensitive screen.
Figure 11:
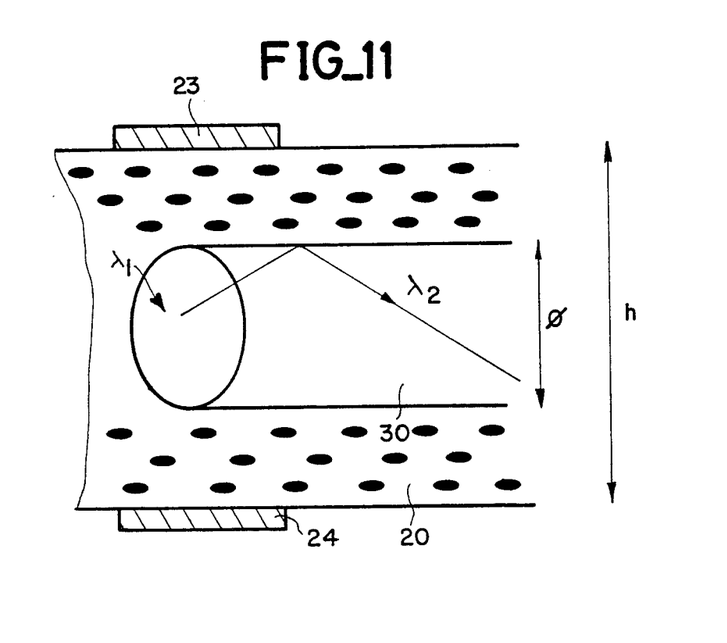

In another variant of construction shown in FIGS. 10 and 11, a network of parallel fibers 30 and 31 are embedded in the luminescent material 20 of the screen.

The screen 2 includes, on each side of the luminescent material 20, parallel electrodes 23, 24 orthogonal to the fibers 30, 31.

The electrodes 23 are fed successively with voltage by a generator 6 and an address circuit 16. Electrodes 24 are at a fixed potential, ground for example.

Whenever an electrode 23 is fed, the light material between this electrode and electrode 24 situated opposite is excited and emits, depending on the energy previously accumulated during exposure to the X rays, light energy which, as is shown in FIG. 11 is picked up by each fiber. The light picked up is trapped by each fiber and is transmitted by successive reflections to a sensor 4 having detectors disposed in lines.

It should be noted that the arrangement of the system of FIG. 9 may be applied to the system of FIG. 10 by providing a matrix sensor 4 and by arranging the ends of the fibers, ending at the sensor, also in the form of a matrix.

It can then be seen that in this variant, the optical coupling between screen 2 and the photon sensor 4 which is a photodetector strip, is achieved by means of optical fibers which are integrated in the luminescent material 20.

The electric addressing is provided for example by columns. In this case, the optical fibers are disposed in lines, as shown in FIG. 10. So that the photons emitted during electric stimulation are indeed picked up by each fiber, it is possible to use a wavelength converting optical fiber, i.e. an optical fiber which absorbs the photons emitted by the luminescent material, at a wavelength $\lambda 1$ then emits photons with an efficiency close to unity at a higher wave length $\lambda 2$. The absorption, reemission and guidance procedure is shown in FIG. 11. This image forming method has the advantage of doing away with any mechanical movement during rereading.

Figure 12:
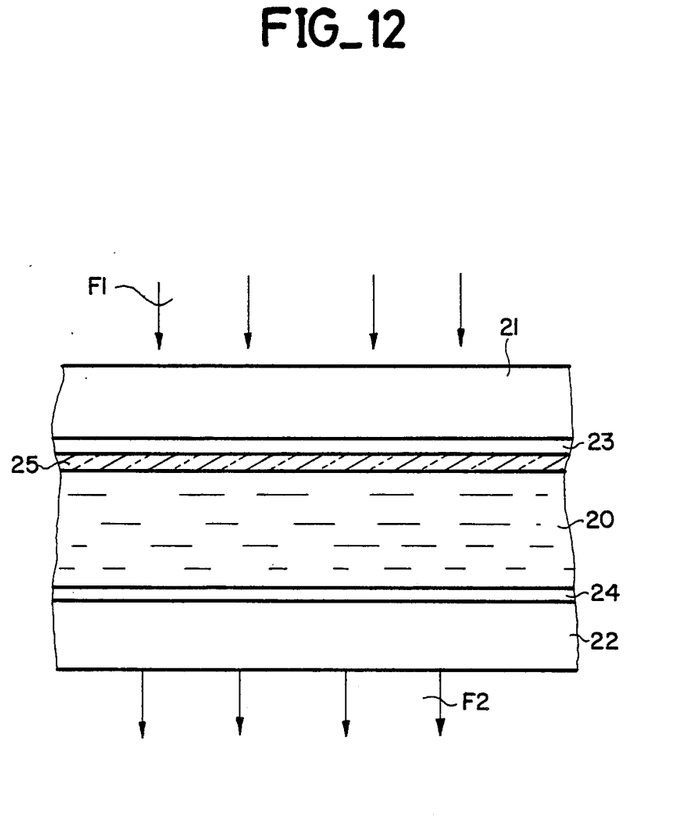
FIGS. 12 and 13, a variant of construction of the system of the invention including blocking electrodes.
Figure 13:
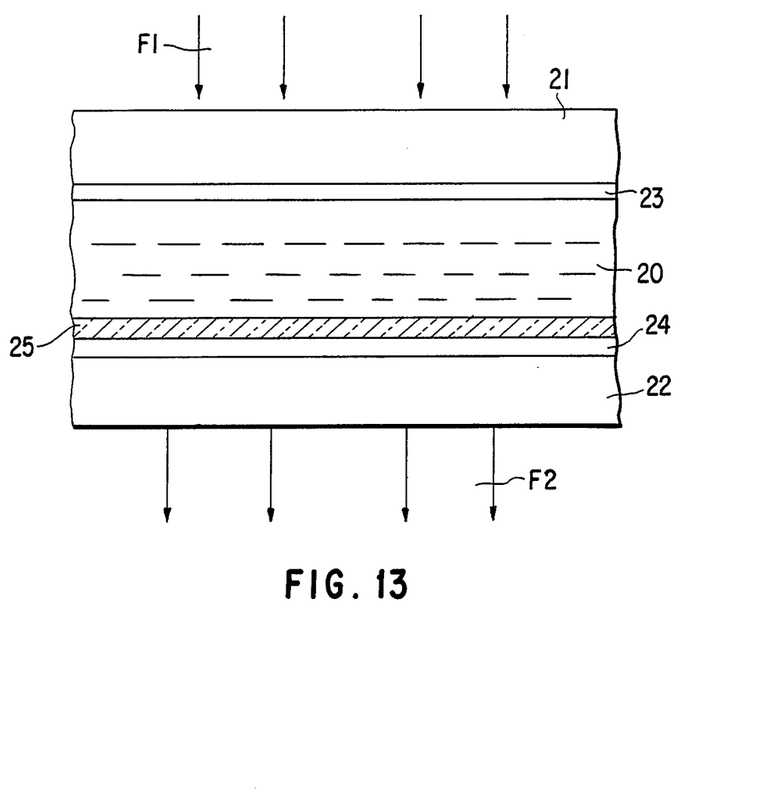

In the preceding description, it has been mentioned that electrodes 23, 24 may be blocking. FIG. 12 shows a variant of the embodiment shown in FIG. 2 in which electrode 23 has been made blocking by providing a layer of a dielectric material 25 such as an organic material. In the case where electrode 23 is made from a metal material, the dielectric layer 25 is deposited on this metal electrode. It is also possible, as shown in FIG. 13, to make the electrodes 24 blocking. For that, a dielectric layer 23 is provided between the luminescent material and the electrodes 24.

What is claimed is:

1. A memory display system including a source of illuminating radiation, producing a beam of given wavelength, a body to be explored, a support medium sensitive to said wavelength and receiving the beam retransmitted by the body, wherein
   the support medium includes, a layer of a luminescent material for accumulating and storing energy, coming from said beam, in metastable states and releasing it under the effect of electric excitation, in the form of a light flux and, means for applying said electric excitation to the luminescent material;
   said layer of luminescent material being enclosed between a first flat plate transparent to said beam and a second flat plate transparent to said light flux, said means for applying said electric excitation including a first electrode situated on the first plate, a second electrode situated on the second plate, and an electric supply means connected to these electrodes for selectively applying different potentials to said electrodes so as to cause said support medium to release light from selected points, one of said electrodes being blocking;
   the display system further including an optical transmission device receiving the light flux and retransmitting it;
   a sensor receiving the light flux retransmitted by the optical transmission device and converting the intensity of the light flux into an electric signal;
   a processing circuit receiving said electric signal, processing it and controlling display thereof on a display device.

2. Memory display system as claimed in claim 1, wherein said optical transmission device is a lens.

3. Memory display system as claimed in claim 1, wherein said optical transmission device is one or more optical fibers.

4. Memory display system as claimed in claim 3, including, on the first plate, a series of electrodes parallel to each other and, on the second plate, a series of electrodes parallel to the preceding electrodes, of the same length and situated facing them, two facing electrodes defining a line of luminescent material, first ends of a given number nxm of optical fibers being aligned along a line of luminescent material so as to collect the light flux emitted by this line of luminescent material, said sensor including a matrix of nxm detectors, control means being provided for moving the first optical fiber ends relatively with respect to the support medium so that these first ends allow successive reading of the different lines of luminescent material.

5. Memory display system as claimed in claim 1, wherein said sensor includes a plurality of detectors.

6. Memory display system as claimed in claim 1, having, on the first plate, a series of horizontal electrodes parallel to each other and, on the second plate, a series of vertical electrodes also parallel to each other and defining with the horizontal electrodes intersection points in the luminescent material.

7. Memory display system as claimed in claim 6, including control means for moving the optical transmission device-and the sensor with respect to the support medium so as to allow reading of the different intersection points by the sensor.

8. Memory display system as claimed in claim 1, including, on the first plate, a series of electrodes parallel to each other and, on the second plate, a series of electrodes parallel to the preceding electrodes, of the same length and situated facing them, said sensor having a series of detectors disposed in a line parallel to the electrodes for receiving a light flux coming from a line of luminescent material situated between an electrode of the first plate and an electrode of the second plate, addressing means being provided for selectively supplying two opposite electrodes with voltage.

9. Memory display system as claimed in claim 8, wherein said sensor has the same length as the electrodes and it includes control means for moving said sensor in a plane parallel to the plane of the plates and orthogonally to said electrodes.

10. Memory display system as claimed in claim 1, wherein said first electrode covers the whole of the face of the first plate, the second electrode covers the whole of the second plate and said sensor includes a series of detectors disposed in an image plane parallel to the plane of the plates for reading different points of the luminescent material contained between the two plates.

11. Memory display system as claimed in claim 10, wherein said detectors are disposed in a matrix.

12. Memory display system as claimed in claim 1, including at least one optical fiber disposed within the layer of luminescent material and having an end coupled to said sensor.

13. Memory display system as claimed in claim 1, including, on the first plate, a series of electrodes parallel to each other and, on the second plate, a series of electrodes parallel to the preceding electrodes, of the same length and situated facing them, optical fibers being disposed inside the layer of luminescent material in a plane parallel to the plates and orthogonally to the electrodes, one end of each optical fiber being coupled to a detector of the sensor.

14. Memory display system as claimed in claim 1, wherein said first electrode is blocking.

15. Memory display system as claimed in claim 14, having a layer of a dielectric material between said first electrode and said luminescent material.

16. Memory display system as claimed in claim 1, wherein said second electrode is blocking.

17. Memory display system as claimed in claim 16, having a layer of a dielectric material between said second electrode and said luminescent material.

18. A memory display system including a source of illuminating radiation, producing a beam of given wavelength, a body to be explored, a support medium sensitive to said wavelength and receiving the beam retransmitted by the body, wherein the support medium includes, a layer of a luminescent material for accumulating and storing energy, coming from said beam, in metastable states and releasing it under the effect of electric excitation, in the form of a light flux and, means for applying said electric excitation to the luminescent material;

said layer of luminescent material being enclosed between a first plate transparent to said beam and a second plate transparent to said light flux, said means for applying said electric excitation including a first electrode situated on the first plate, a second electrode situated on the second plate, and an electric supply means connected to these electrodes for selectively applying different potentials to said electrodes so as to cause said support medium to release light from selected points;

wherein said first electrode covers the whole of the face of the first plate, the second electrode covers the whole of the second plate and said sensor includes a series of detectors disposed in an image plane parallel to the plane of the plates for reading different points of the luminescent material contained between the two plate and wherein said sensor has the same dimensions as the support medium and is applied against the plate of the support medium;

a sensor receiving the light flux retransmitted by the optical transmission device and converting the intensity of the light flux into an electric signal;

a processing circuit receiving said electric signal, processing it and controlling display thereof on a display device.

* * * * *